No. 618,973. Patented Feb. 7, 1899.
W. F. ALTENBAUGH.
MACHINE FOR AUTOMATICALLY LADLING GLASS IN MANUFACTURING GLASSWARE.
(Application filed Nov. 3, 1897.)
(No Model.) 6 Sheets—Sheet 1.
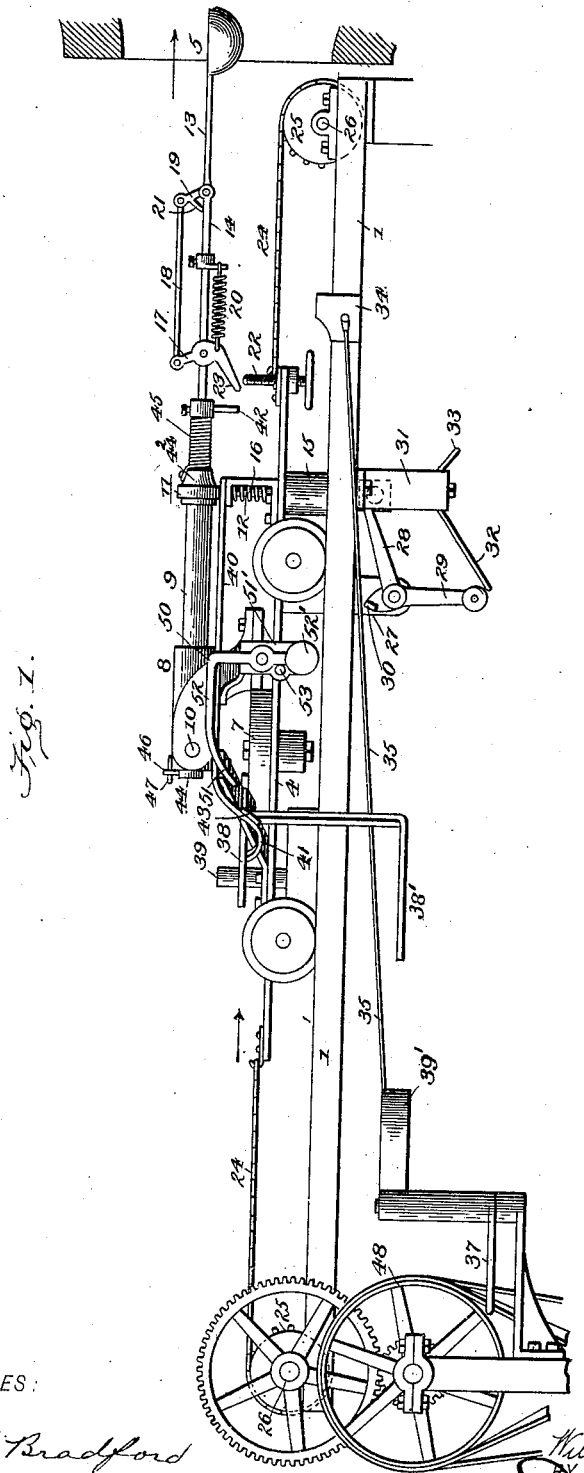
WITNESSES: INVENTOR

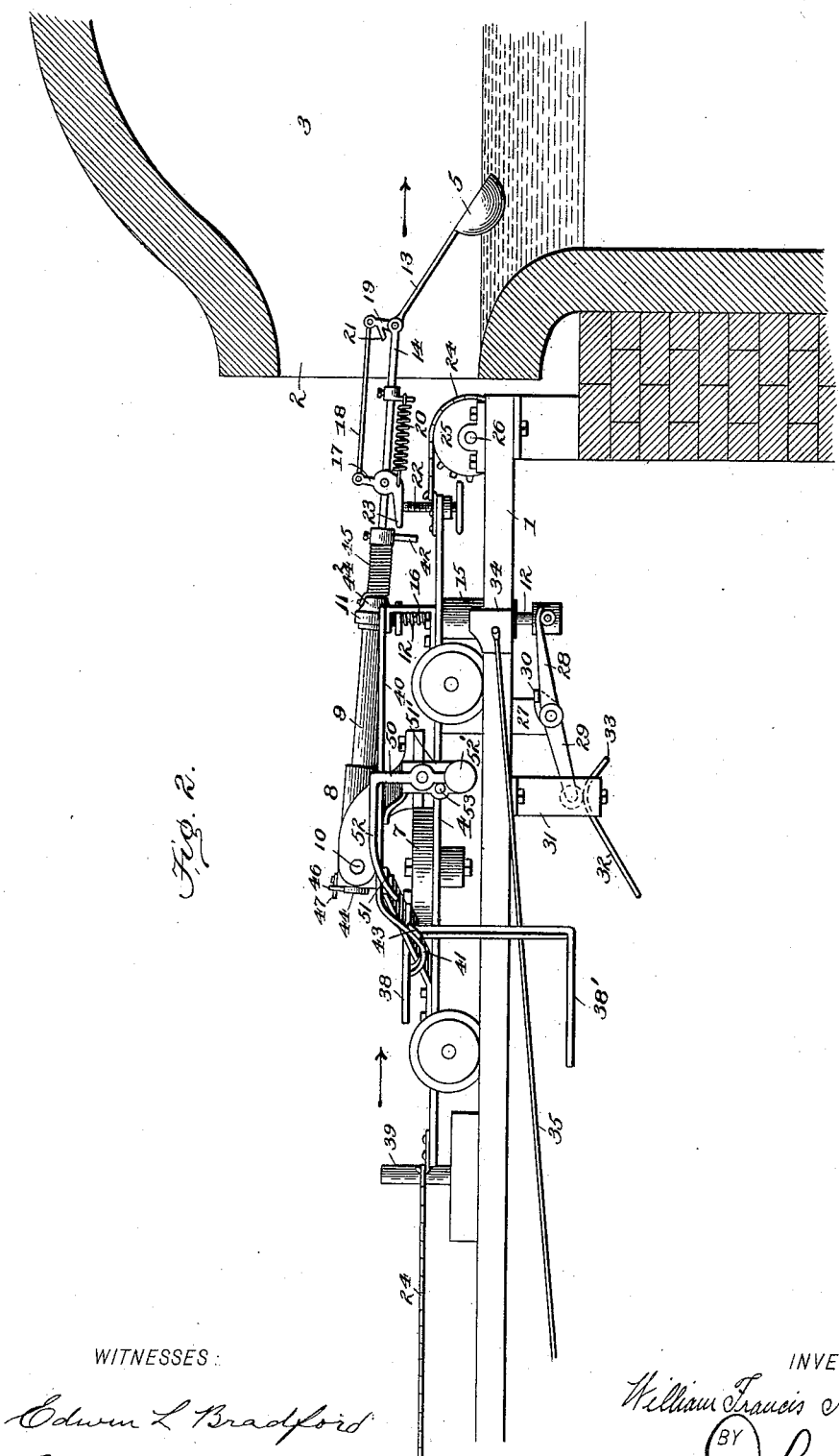

No. 618,973. Patented Feb. 7, 1899.
W. F. ALTENBAUGH.
MACHINE FOR AUTOMATICALLY LADLING GLASS IN MANUFACTURING GLASSWARE.
(Application filed Nov. 3, 1897.)
(No Model.) 6 Sheets—Sheet 3.
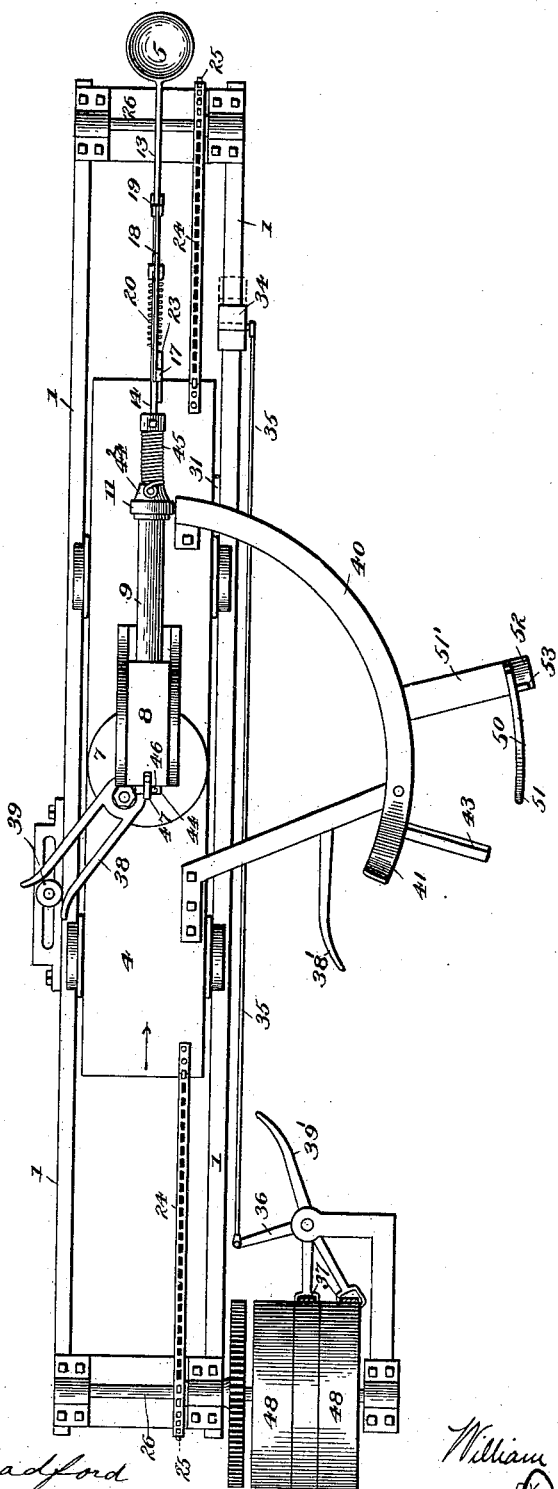

No. 618,973. Patented Feb. 7, 1899.
W. F. ALTENBAUGH.
MACHINE FOR AUTOMATICALLY LADLING GLASS IN MANUFACTURING GLASSWARE.
(Application filed Nov. 3, 1897.)
(No Model.) 6 Sheets—Sheet 4.
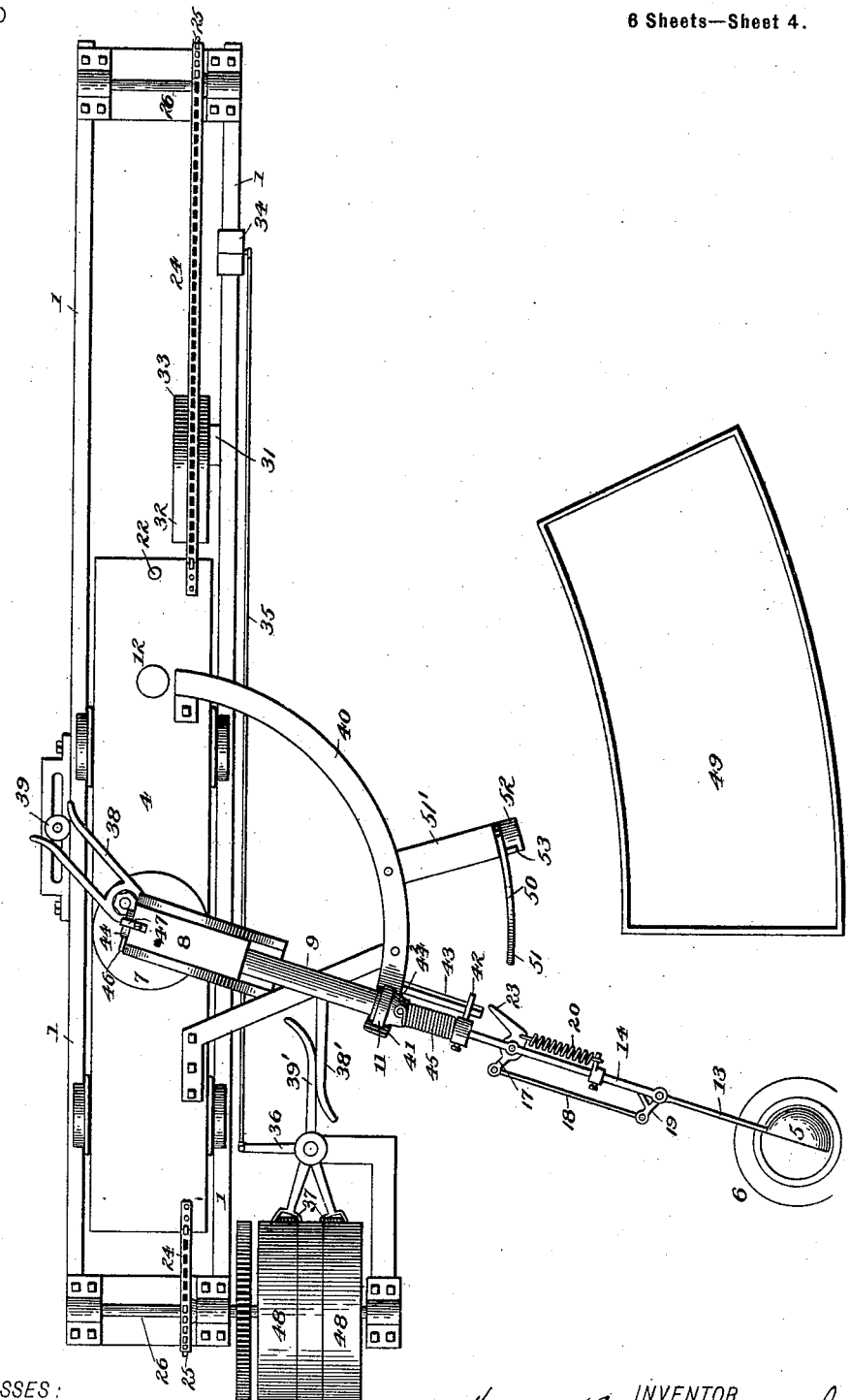

No. 618,973. Patented Feb. 7, 1899.
W. F. ALTENBAUGH.
MACHINE FOR AUTOMATICALLY LADLING GLASS IN MANUFACTURING GLASSWARE.
(Application filed Nov. 3, 1897.)
(No Model.) 6 Sheets—Sheet 5.
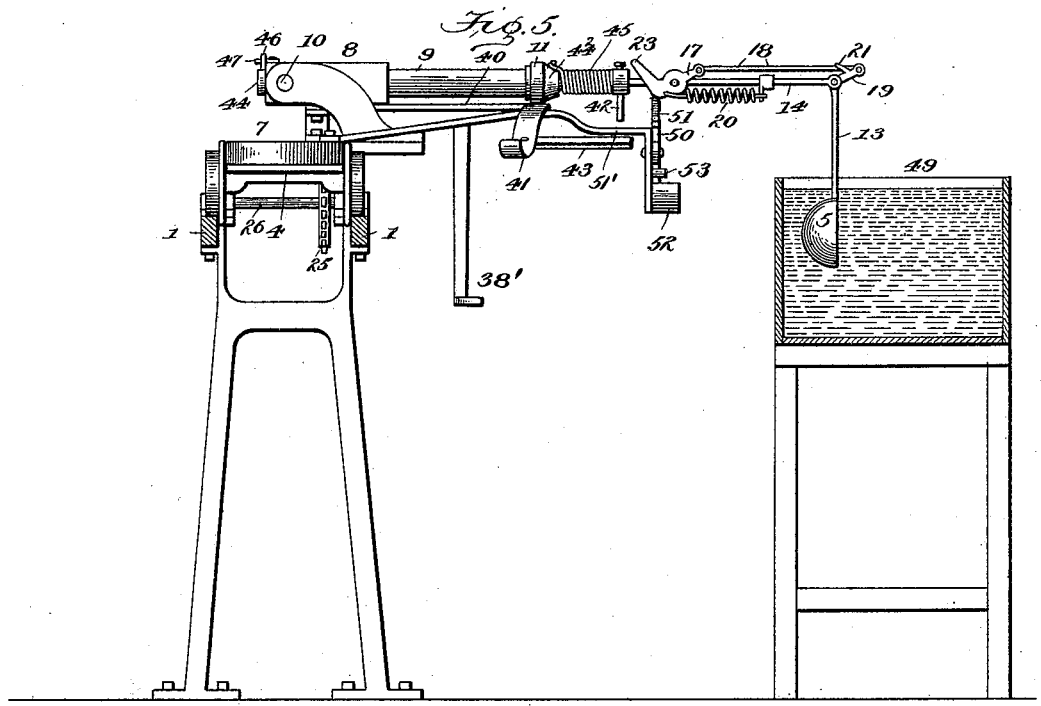
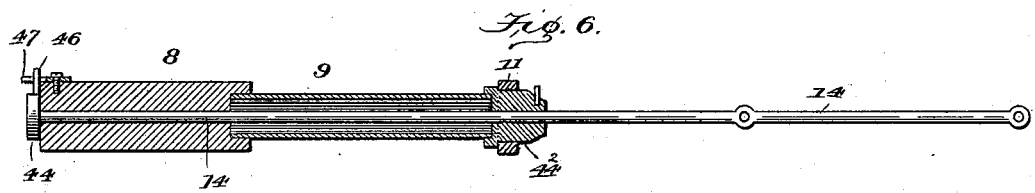
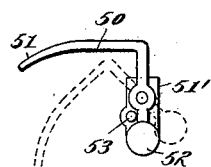
WITNESSES:
Edwin L Bradford
Ferris D Morris
INVENTOR
William Francis Altenbaugh
BY
Johnson & Johnson
ATTORNEYS.

No. 618,973. Patented Feb. 7, 1899.
W. F. ALTENBAUGH.
MACHINE FOR AUTOMATICALLY LADLING GLASS IN MANUFACTURING GLASSWARE.
(Application filed Nov. 3, 1897.)
(No Model.) 6 Sheets—Sheet 6.
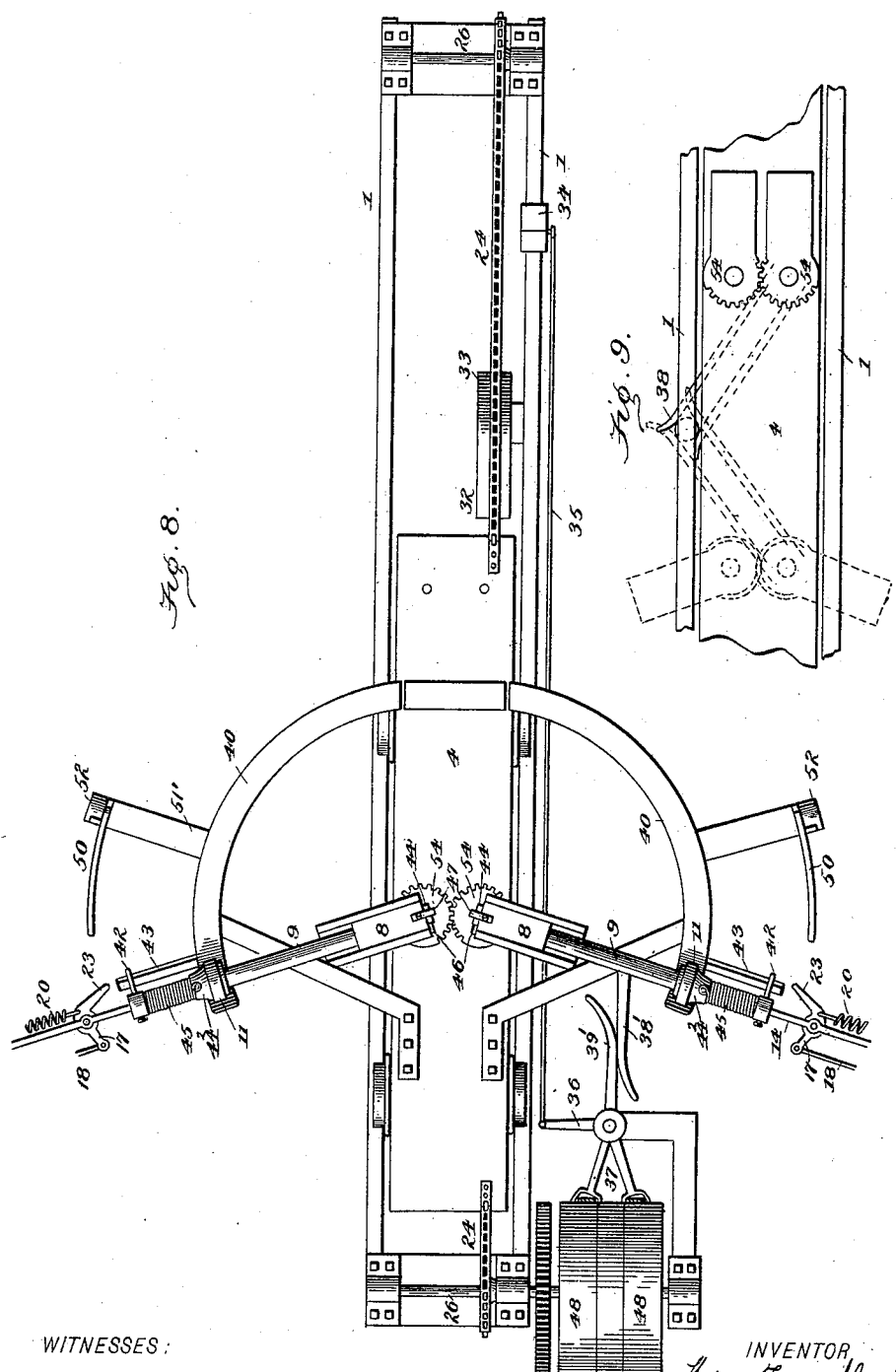

UNITED STATES PATENT OFFICE.

WILLIAM FRANCIS ALTENBAUGH, OF TIFFIN, OHIO, ASSIGNOR OF ONE-HALF TO GEORGE BEATTY, OF ROCHESTER, PENNSYLVANIA.

MACHINE FOR AUTOMATICALLY LADLING GLASS IN MANUFACTURING GLASSWARE.

SPECIFICATION forming part of Letters Patent No. 618,973, dated February 7, 1899.

Application filed November 3, 1897. Serial No. 657,228. (No model.)

*To all whom it may concern:*

Be it known that I, WILLIAM FRANCIS ALTENBAUGH, a citizen of the United States, residing at Tiffin, in the county of Seneca and State of Ohio, have invented certain new and useful Improvements in Machines for Automatically Ladling Glass in the Manufacture of Glassware, of which the following is a specification.

For the manufacture of articles of glass I have produced a machine whereby the molten glass is automatically gathered from the working chamber or pot by a ladle and automatically delivered from the ladle into a mold for its manufacture into the pressed article. In this operation the ladle has the function of a measurer, wherein the exact quantity of glass is gathered from which the article is to be press-formed, and the gathering and the delivering operations are effected by imparting to the ladle a movement whereby it is caused to enter the pot with a dipping movement, gather the glass, and then, rising from the surface and withdrawing from the chamber of the pot, is caused to have a sidewise swinging movement to carry the ladle over a mold, at which point the swing of the ladle is arrested and it is caused to have a tilting movement to deliver the glass into the mold for being pressed into form. In being returned then to the pot to repeat the gathering operation the ladle is caused to be turned up in position to again enter the pot with a gathering action. In this returning movement the ladle is passed through a cooling-bath. For carrying out such operation my improvements consist of certain novel parts and combinations of parts hereinafter specifically set forth in the claims concluding this specification. Before specifying such claims I will describe the machine illustrated in the accompanying drawings.

The following description, read in connection with the drawings, will enable any one skilled in the art to which my invention relates to understand its nature and to practice it in the form which I prefer to employ it; but it will be understood that my invention is not limited to the precise form herein illustrated and described, as various modifications may be made without exceeding the scope of the concluding claims.

The special work for which the machine is organized is what is known as "pressed ware," and for this purpose the provision of a measuring-ladle and mechanism whereby it is automatically operated in its gathering and in its delivering functions at the pot and at the mold constitute the primary features of my present invention.

In the drawings referred to, Figure 1 represents in side elevation the said machine, wherein the gathering-ladle is shown in the position it occupies in its forward movement into the working pot or chamber. Fig. 2 is a like view of so much of the machine as shows the gathering-ladle as having entered the working chamber and dipped into the surface of the glass in the position it assumes in moving forward to gather it. Fig. 3 is a top view of the machine, the gathering-ladle being in the position shown in Fig. 1. Fig. 4 is a like view of the machine, the gathering-ladle being shown in the position it occupies when withdrawn from the pot and swung around at the side of the machine to deliver the charge of glass to the mold. Fig. 5 shows the machine in cross-section and the ladle-carrying parts in the positions they occupy when the ladle is passing through the cooling-bath in its return movement to the pot. Fig. 6 is an axial section of the ladle-carrying swing-head. Fig. 7 shows the pivotally-hung cam whereby the ladle is swung down into the bath. Fig. 8 shows so much of the machine as illustrates the gathering-ladles in duplex arrangement for operation as a single machine; and Fig. 9 shows in detail the geared turn-tables, the bifurcated arm carried by one of the turn-tables, and the fixed roll which engages and actuates the said arm, as I have described, to actuate the duplex ladles.

The operating parts of the machine are arranged upon horizontal beams 1, which are suitably supported and have fixed relation to and extend from the opening 2 in the working chamber or pot 3, and upon these beams a carriage 4 is mounted and caused to travel toward and from said chamber to carry therein the gathering-ladle 5 and bring it out of the chamber filled with molten glass. In this outward movement of the carriage the ladle is caused to be swung around to the side of the machine and to deliver the glass into the press-mold 6, located within the radius described by the swing of the ladle. The carriage is mounted to travel upon flanged wheels, and for this purpose the beams form ways suited to the extent of the travel of the carriage for carrying the ladle into and out of the pot. A turn-table 7 is suitably mounted upon the carriage, and a swing-carrier 8 for the ladle is pivotally mounted upon the turn-table. As shown, the carrier consists of a part 9, preferably tubular, having its outer head end pivoted at 10 to the turn-table and its inner end freely resting by a roll 11 upon the upper end of a vertical spring-sustained support 12, for a purpose which I will presently state. The ladle has an arm 13, by which it is pivoted to the end of a rod 14, which passes through and is seated within the pivoted swing-head. In their normal positions these parts are horizontal, being so sustained by springs, so that the ladle-arm, its pivotally-connected rod, and the pivotally-connected swing-head will stand in line, as shown in Fig. 1. The ladle-carrying head is adapted to have a slight vertical swing movement upon its pivoted end, and the ladle is adapted to have a vertical swing movement upon its pivotally-connected rod, whereby the ladle will be caused to have a determined dipping and a lifting movement simultaneously with its movement into and out of the chamber, and this is one of the features of my invention.

The spring-sustained support for the ladle-carrying head consists of a stem 12, fitted to slide vertically in a guide 15 on the carriage and provided with a spring 16, which constantly tends to press the stem up and to maintain the swing-head, which rests thereon, in its normal position. The provision for depressing this stem to allow that end of the swing-head which rests upon it to have a descending movement I will presently describe. The provision whereby the ladle is caused to have a dipping movement and a lifting movement in its gathering function consists of a lever 17, pivoted to the ladle-carrying rod 14 and connected by a link 18 to a branch arm 19 on the pivoted end of the ladle-arm. A spring 20, connecting the lever with the ladle-carrying rod 14, constantly tends to pull the ladle to a horizontal position and in a line with its carrying-rod, as seen in Fig. 1, and for this purpose the branch arm of the ladle has a stop 21, which engages the ladle-carrying rod against the pull of the spring. The provision for causing the ladle to dip consists of a suitable projection 22 on the carriage, arranged to engage a cam 23 of the lever 17, which in the descent of the swing-head is forced against the said projection, thereby lifting the cam-arm, so as to push back the lever 17 against the tension of its spring 20, and, pushing forward the ladle-connecting rod 18, allows the ladle to dip into the molten glass as it is moving into the pot. The limiting of this dipping brings the ladle in an inclined position in relation to its carrying-rod and in a position to skim the surface of the molten glass as it is carried forward into the pot and thereby filled to just what it will take by its position. For this purpose the carriage need only advance a short distance after the ladle has been dipped into the glass, and it will be seen that the action of the dipping device is such as to give a comparatively slow dipping movement to the ladle and a slow rising movement to its normal position. This rising movement commences as the carriage commences its return movement, and the inclined cam-arm 23 of the lever 17 is relieved from the action of the lifting projection 22, so that the spring 20 pulls back the lever and its ladle-connecting link to bring the ladle to a level. This lifting projection is preferably a screw rising from the carriage, and by its vertical adjustment the dipping of the ladle is regulated and fixed by a lock-nut, so that the quantity the ladle will take is thereby measured to suit the mold and the article to be produced. By raising the screw the ladle will dip more. Any shape and size of ladle may be used.

The carriage is reciprocated within certain limits preferably by a sprocket-chain 24, connected to it and passing around sprocket-wheels 25, carried by shafts 26, mounted at each end of the fixed frame, whereby the ladle is carried to and out of the pot or chamber within, which, it will be understood, the molten glass is maintained at a uniform level and from the surface of which the ladle gathers a measured quantity.

The machine is operated by power in any suitable way, as by belts running on fast and loose pulleys on the sprocket-wheel shaft, the belts being shipped by means of a suitable shifting device which I will presently explain.

The provision whereby the swing end of the ladle-carrying head is caused to descend consists of a lever device actuated by fixed inclines, as I will now describe.

To a hanger 27 on the under side of the carriage is pivoted a lever of two separate parts, one of which, 28, stands forward and is adapted to engage the lower end of the spring-sustained stem 12, on the upper end of which the swing end of the ladle-carrying head rests. The other lever part, 29, normally stands down, as in Fig. 1, and has a short arm 30 in position to be engaged by the stem-connected lever part 28, as in Fig. 2, in a way to pull down said stem against the tension of its sustaining-spring 16, so that when the stem is not pulled down it will be maintained in its normal position, holding the ladle-connecting rod horizontal, as in Fig. 1.

In position near the working chamber or pot is a hanger 31, fixed to the under side of the frameways and having a fixed incline of two parts standing downward from each side of the hanger. That side, 32, of this incline which stands away from the working chamber is adapted to receive the lower lever part 29 as the carriage moves forward to carry the ladle into the pot, and as said lower lever part engages and rides up the incline 32 the lever part 29 is pushed back away from the pot and brings its short arm 30 down upon the upper lever part 28, bearing upon and pulling it down, and thereby pulling down its spring-sustained stem, the descent of which allows the swing end of the ladle-carrying head to descend gradually, and the ladle is thereby caused to have a dipping swing as it enters the chamber or pot, as in Fig. 2. The extent of the descent of the swing-head is limited by the action of this incline 32, and the extent of the descent of the lever device which effects the dipping of the ladle is also limited by this incline. Having passed the limit of the depressing action of the incline 32, which is its highest point, the lever part 29 descends the other side 33 of the incline and releases the depressing action upon the spring-sustained stem 12, which under the tension of the spring elevates said stem and the ladle-carrying head, and the engaging end of the lever part 28, acting as a stop, limits the ascent of the stem, brings said carrying-head to a horizontal position, and supports it while moving back. The dropping of the lever off the incline 33 allows the lever part 29 to hang down, so that it will pass back and ride over the double incline to its normal position, as in Fig. 1, without acting upon the spring-sustained stem in the reverse movement of the carriage to withdraw the gathering-ladle.

It will be understood that except at the instant of reversing the movement of the carriage the advance and return of the ladle into and from the working chamber will be continuous. The reversal of the movement of the carriage to withdraw the ladle from the chamber is effected as follows: As the forward movement of the carriage approaches its limit it is caused, preferably by one of its wheels, to come in contact with a slide 34 or other device movably seated upon or connected to the carriage-way beam, and so move or act upon said slide as to cause it by means of a connecting-rod 35 to shift the operating-belts and thereby reverse the movement of the operating-gear and move the carriage back to the position seen in Fig. 4. For this purpose the simple shifting device shown may be used for actuating the reversing-rod 35 to return the carriage, the said rod connecting a lever 36, pivoted at the driving end of the machine and suitably connected with belts 37, to shift them from a loose pulley for each belt to a fast pulley.

The provision whereby the ladle is caused to have an outward swinging movement at the side of the machine to deliver the measure of glass to the mold consists of an arm 38, preferably bifurcated, normally standing from the turn-table, which arm as the carriage moves back is carried into engagement with a roll 39, fixed upon the frame and located so as to cause it to act upon the arm 38 as it moves back and turn said arm around outward, and thereby turn the turn-table and cause the ladle carried by the turn-table to be swung around at the working side of the machine to carry and deliver the quota of glass which has been gathered by the ladle into the press. In this operation the position of the arm becomes reversed, so as to stand forward, having made nearly a quarter-revolution. The roll 39, which engages the turn-table arm to effect this sidewise swinging movement of the gathering-rod as it is moving back, is fixed to a bracket at the side of the frame, and said roll is made adjustable lengthwise of the frame, or the arm may be adjusted so as to limit the swinging movement of the ladle to bring it exactly over the press-mold for the delivery of the glass therein. In this action of the roll-engaging arm for swinging out the ladle while the carriage is moving back both the carriage and the ladle are stopped at the same time by the automatic action of a cam-arm 38' of the belt-shifting device, which as the carriage moves back strikes the cam-arm 39' and shifts the belt-shifting lever, which stops the carriage, as seen in Fig. 4, by placing both belts on the loose pulleys. As the ladle reaches a point directly over the chamber of the mold the ladle-carrying rod is rocked, which tilts the ladle to pour out the glass into the mold, and the means for effecting this operation I will now describe. For supporting the ladle in its lateral swinging movements I provide a horizontal ledge or way 40, preferably fastened to the carriage, and which extends out from its side and terminates in a gradual incline and in a sunken seat 41, preferably concave, whereby at the limit of the lateral swinging movement the swing-head is caused to slide down into said way-seat and be held over and just above the top of the mold. In descending to said seat a pin or lug 42, fixed on the ladle-carrying rod 14, is caused to engage an arm 43, fixed to the ledge or way, which engagement by arresting the swing movement of the pin 42 turns or rocks the ladle-carrying rod and tilts the bowl a quarter of a revolution, thereby pouring out the glass, as in Fig. 4. In this position the ladle may remain only long enough to empty it, when the carriage is started on its return movement by the operator moving the arm 39' of the shifting-lever inward, which at once shifts the belts and starts the carriage forward by its chain connection with the driving-gear. As the carriage starts forward the ladle swing-head at the same time starts to swing forward, rising from its seat 41, and in doing so the pin 42 of the ladle-carrying rod passes free of the arm 43 and the rod 14 is caused to be turned or rocked on its longitudinal axis to bring the ladle-bowl to its normal position. The ladle-carrying rod for this purpose is fitted to turn or rock in its bearings in the swing-head, within which it is confined by a collar 44 on the end of the rod, while a spring 45, fastened to the swing end 44² of the head and by its other end to the ladle-carrying rod, acts by torsion to bring the ladle-bowl in its normal position and to so hold it while being entered and withdrawn from the pot and while being swung out at the side to deliver the charge and swung back in position to receive another charge. In effecting and maintaining this position of the ladle the torsional action of the spring is controlled by a pin or lug 46 on the ladle-carrying rod engaging a stop 47 on the swing-head, said pin being preferably on the outer end of said rod and the stop on the pivoted end of the swing-head. In Figs. 1, 2, 3, 4, and 5 the torsion-spring is seen connected to the rod 14 by the collar of the pin 42 and to the end 44² of the swing-head, so that the torsional force of the spring is constantly exerted to prevent the tilting of the ladle and to return it when tilted. Preferably the swing-head is mounted by trunnions in brackets rising from the turn-table, and the swing end of the head is provided with the roll 11, whereby it rolls off the upper end of the spring-sustained stem 12, on which the swing-head rests directly upon the ledge or way 40, and thereby renders easy the swing movements of the head. The brackets form lateral supports for the swing movements of the ladle-carrying head. As the carriage advances with the ladle-bowl held horizontal the normal condition of the acting end of the lever cam-arm 23 is about on a level with the acting end of the stop 22, and it is by the relation of these two coacting parts that the descent of the swing-head will bring the said cam-arm in contact with the stop, and it is by such contact that the weight of the swing-head is made the means for bringing the ladle-bowl to a skimming position in the chamber, and this constitutes one of the features of my invention.

In Fig. 4 the shifting-lever is in position, having placed the belts on the loose pulleys 48, which are on each side of the fast pulley, and stopped the backward movement of the carriage to give time to deliver the glass into the mold. As soon as the glass is delivered from the tilted ladle the carriage is started forward by shifting the belts, by hand or otherwise, and the ladle, by the action of the turn-table arm engaging the fixed roll, swings back into line with the frame and is carried forward to repeat the operation while the operator is finishing an article. In this shifting movement the belt-shifting rod 35, with its slide 34, is drawn back, which places the said shifting slide in position to be acted upon and moved forward again as the carriage moves forward to carry the ladle into the pot.

To keep the heat of the ladle-bowl comparatively low, provision is made for causing it to pass through a cooling-bath after having delivered the charge of glass and while being swung back to the pot. This provision consists of a tank 49 for containing water placed between the mold and the pot and of sufficient length to allow the ladle to remain in the water-trough during a part of its travel to the pot. For this purpose the ladle is caused to swing down in position preferably at right angles to its carrying-rod, as seen in Fig. 5. The means for swinging down the ladle-bowl into the bath consists of a suitable cam 50, carried by the carriage ledge or way in a position to engage the lever-arm 23 of the ladle-dipping device, as seen in Fig. 4, whereby such engagement lifts the lever-arm 23 against the tension of its connected spring 20 and allows the ladle-bowl to swing down by its lever-connecting rod 18 into the bath as the ladle is swinging toward the pot. This cam 50 I prefer to form with an inclined part 51, Fig. 7, and with a horizontal part 50, so that as the lever-arm 23 strikes the cam inclined part the ladle-bowl will thereby descend into the bath, and as the lever-arm is passing over the horizontal cam part the ladle-bowl will remain in the bath. As the lever-arm leaves the horizontal part of the cam the ladle-bowl will be caused to swing up out of the bath and resume its normal position.

I prefer to pivotally hang the cam 50 to a bracket 51' on the carriage ledge or way and to form it so that a weight 52 will hold it in its normal position, as in Fig. 7, to receive the action of the lever-arm 23 as the ladle is moving to the pot; but when the ladle is moving to the mold the lever-arm when it strikes the pivoted cam will cause it to swing out of the way and give no resistance to the movement of the swing-head or against the lever-arm.

It will be understood that whether the swing-head is moving from the pot or from the mold the lever-arm 23 will stand down in the path of the hanging cam 50 and that the weighted end of the latter will engage a stop 53 to hold the cam from swinging when the lever-arm is in engagement with it to bring the ladle into the bath.

I have described the machine as operating with a single ladle; but two ladles may be arranged for identical operation at the opposite sides of the machine, as shown in Fig. 8. The provision for effecting the operation of the two ladles consists in mounting each ladle-carrying head upon the carriage by separate turn-tables and gearing these turn-tables together, so that the swinging movement of one at one side of the machine will to the same extent effect and govern the extent of the movement of the other at the other side of the machine. For this purpose the turn-tables are formed with or provided with engaging gear 54 of equal size, so that they will be operated synchronously. In this case the means, such as the bifurcated arm, for effecting the swinging movements of the ladles may be arranged beneath the carriage and connected with one only of the turn-tables, as shown in Fig. 9. The bifurcated arm 38 can be set to give the proper movements to the ladle-carriers, and this arm operates both ladles in relation to the one working chamber or pot and to a mold for each ladle by means of the geared turn-tables. In the forward movement of the carriage the swing-heads of both ladles are caused to swing together in parallel relation and move into and out of the chamber in such relation, while in the outward movement of the carriage the swing-heads of both ladles, after leaving the chamber, open, swinging the ladles out at the opposite sides of the machine, each ladle to its working mold.

The machine by its automatic operation takes the place in the factory of a skilled workman, and its operation gives the gathering-ladle positive and exact movements for every gathering in the pot and from the pot to the press, with the gathered glass made uniform with every charge. In such operation the reciprocation of the carriage and the swinging movements of the ladle are determined as to the time of operation of each, so that the ladle will be brought into longitudinal relation with the carriage in its advance into the chamber, while the outward-swinging movement of the ladle will be brought to a stop at the same time the rearward movement of the carriage is stopped. It is also important to note that the ladle-bowl, having taken a measured quantity of glass, is brought to a level position as it is being withdrawn from the chamber and is held level by the coacting functions of the springs which connect with the ladle and the ladle-carrying rod, and this is a feature of my invention. It is also important to note that the provision whereby the swing-head is free to descend is for a twofold purpose—that is to say, to lower the ladle-carrying rod as it advances, and thereby lessen the inclination of the ladle to properly place the bowl for skimming, and to utilize the weight of the swing-head and its ladle-connecting parts as the means whereby the ladle-connecting lever is actuated to cause such descent of the ladle. All the functions of the ladle are rendered automatic by the reciprocating movements of the carriage and the vertical movements of the swing-head, and these are matters which constitute features of my invention.

It will be understood that many of the devices above described are not essential separately connected. This will be indicated in the concluding claims, as in any given claim the omission of an element or the omission of reference to the particular features of the elements mentioned is intended to be a formal declaration of the fact that the omitted elements or features are not essential to the invention therein described.

I claim as my invention—

1. For gathering and conveying glass from a melting-chamber to a mold, the combination with a reciprocating carriage, a rod pivotally mounted thereon and a ladle pivotally jointed on said rod, of means connecting said rod and ladle to maintain them in alinement, a device on the carriage arranged to be engaged by the ladle connections, to cause the ladle to dip on its pivot on the advance movement of the carriage, means constructed and arranged to cause said ladle connections to effect such engagement, means constructed and arranged to cause the ladle-carrying rod to have a laterally-swinging movement, and means on the carriage for engaging the ladle-carrying rod on its outward swing whereby to cause the ladle to be tilted.

2. In a machine for gathering glass and conveying it from a melting-chamber to a mold, the combination with a reciprocating carriage, a rod pivotally mounted thereon, and a ladle jointed upon said rod, of means connecting the ladle and the rod to maintain them in alinement under yielding tension, a device on the carriage arranged to be engaged by said ladle connections and means for depressing said rod on the advance movement of the carriage whereby to effect the engagement of the ladle connections with the said carriage device to cause the dipping of the ladle on its joint in the operation of gathering a measured charge.

3. In a machine of the class described and in combination with a reciprocating carriage, a swing-head pivotally mounted on said carriage, and a rod carried by said swing-head, of a ladle jointed to flex on said rod, a bearing 22 on the carriage and a pivotally-mounted device on said rod arranged to engage said bearing on the forward movement of the carriage to cause the ladle to dip to gather a charge and means on the carriage arranged to engage means 42 on the rod whereby to tilt the ladle to deliver the charge.

4. In a machine of the class described, the combination, of a pivotally-mounted ladle, a carrying-rod therefor and a swing-head for said carrying-rod, a lever pivoted on said rod, a link connection for the ladle and said lever, a spring connecting said lever and rod for elevating the ladle, a stop for limiting such elevation, means for operating said lever, whereby the descent of the ladle is effected and determined, and a reciprocating carriage on which said swing-head is pivotally mounted.

5. In a machine of the class described, the combination of a pivotally-mounted ladle, a carrying-rod therefor and a swing-head for said carrying-rod, a lever pivoted on said rod, a link connecting the ladle and said lever, a spring connecting said lever and rod, a stop on the carriage coacting with said lever to limit the descent of the ladle, a stop on the ladle coacting with the rod to limit the ascent of the ladle, and a reciprocating carriage upon which the swing-head is pivotally mounted.

6. In a ladling-machine, and in combination with a reciprocating carriage, a rod pivotally mounted on said carriage, a ladle pivotally mounted on said rod, means including a bearing or projection on said carriage and a device pivoted on said rod for engaging the ladle and said carriage-bearing for causing the ladle to dip and for limiting the dip, and means including said pivoted device for effecting and for limiting the ascent of the ladle, the means for effecting said movements of the ladle being controlled by the reciprocation of the carriage.

7. In a machine for automatically ladling glass in the manufacture of glassware and in combination with a reciprocating carriage, a ladle, a rod to which said ladle is pivoted, a swing-head for said rod pivotally mounted on the carriage, means, including a pivoted device on said rod and a bearing on the carriage coacting with said pivoted device to tilt the ladle on the forward movement of the carriage and means arranged and actuated to cause the weight of said swing-head to effect such dipping of the ladle.

8. In combination, in a machine of the class described, with a reciprocating carriage, of a ladle, a rod to which the ladle is pivoted, a pivotally-mounted swing-head on said carriage carrying said rod, means including a pivoted device on said rod connecting the rod and the ladle for maintaining their alinement, and means arranged and constructed to engage said connecting means on the forward movement of the carriage whereby the ladle is caused to advance into the working chamber with an automatically-controlled dipping skimming movement.

9. The combination with a reciprocating carriage, of a ladle, a rod to which the ladle is pivoted, a pivotally-mounted swing-head carrying said rod, a turn-table upon said carriage carrying said swing-head, means connecting the rod and the ladle for maintaining their alinement, a bearing part rising on the carriage, means constructed and arranged to cause the ladle-and-rod connection to engage said carriage-bearing part, means operating to turn said rod upon its longitudinal axis to tilt the ladle, a torsion-spring connecting the rod and swing-head for returning the ladle from its tilted position and means operating to swing out the ladle to its point of tilting.

10. In a machine for gathering glass in the manufacture of glassware, and in combination with a reciprocating carriage, a ladle, a rod on which it is pivotally mounted, a lever on the rod connecting the ladle, a spring connecting the lever and rod, a screw 22 on the carriage for engagement with said lever and a stop carried by the ladle-arm for engagement with its carrying-rod, a lifting and a depressing device for the ladle mounted on the carriage and a fixed device coacting with said lifting device, the several elements connected and arranged for operation by the reciprocation of the carriage.

11. The combination of a ladle, a rod upon which it is pivotally mounted, said rod mounted to automatically turn upon its longitudinal axis for the purpose of tilting the ladle to deliver the glass, means for holding the ladle and its carrying-rod in alinement during such movements, means constructed and arranged to turn said rod to tilt the ladle, means constructed and arranged to swing the ladle from the glass-containing chamber to deliver the glass, means constructed and arranged to limit the tilting of the ladle, and means constructed and arranged to return the ladle to a level position.

12. In a machine for gathering glass in the manufacture of glassware and in combination with a reciprocating carriage, and a turn-table thereon, a swing-head on said turn-table, a ladle, a rod, journaled in said swing-head and on which the ladle is pivotally jointed, a lever pivoted on said rod, means for connecting the lever and ladle, a screw on the carriage, means constructed and arranged to cause said lever to engage with the screw, a torsion-spring connecting the rod and swing-head, a stop 46 on the rod engaging the swing-head against the torsional action of the spring, a pin 42 on the rod, means for laterally swinging the ladle, and an arm 43 on the carriage adapted to engage the rod-pin 42 whereby to tilt the ladle against the torsional action of the spring, the said elements constructed and arranged to be actuated by the reciprocation of the carriage.

13. In combination, in a machine for gathering glass in the manufacture of glassware, a reciprocating carriage, a turn-table thereon, a swing-head pivotally mounted on the turn-table, a rod adapted to turn in its longitudinal axis within said swing-head, a ladle pivotally mounted on said rod, means constructed and arranged to actuate said ladle to gather a charge in the way described, means whereby the ladle is swung out at the side of the machine, means constructed and arranged to tilt the ladle to deliver the charge, a cooling-bath, and means constructed and arranged to turn down the ladle into and carry it through said bath in its return movement.

14. In a machine for gathering glass in the manufacture of glassware, and in combination with a carriage and a ladle pivotally mounted thereon, mechanism whereby the ladle is caused to be presented to take up a charge, mechanism whereby it is swung out at the side of the machine, mechanism whereby it is tilted to deliver the charge, a cooling-bath in the return path of the ladle and a cam on said carriage adapted to engage and actuate the ladle to cause it to be swung down into the cooling-bath and permit it to resume its normal position in leaving said bath.

15. In combination in a machine for gathering glass in the manufacture of glassware, a gathering-ladle and means constructed and arranged to operate the ladle to gather glass in a measured quantity from a working chamber, and to swing the ladle out at the side of the machine to deliver the gather, a cooling-bath located in the path of the laterally-swinging ladle, and means constructed and arranged to operate to cause the empty ladle to be swung down into said bath and to be returned to its normal position on its way to receive a charge.

16. In a machine for gathering glass in the manufacture of glassware, and in combination with a carriage, a ladle-carrier pivotally mounted thereon, a ladle pivotally mounted on said carrier, mechanism whereby the ladle is caused to be presented to take up a charge, swung out at the side of the machine and tilted to deliver the charge, a cooling-bath in the return path of the empty ladle, a lever device connecting the ladle and its carrier, a cam device pivotally mounted on said carriage in the path of the lever device, whereby the ladle is caused to be swung down into said bath and returned to its normal position in the way described.

17. In a machine for gathering glass in the manufacture of glassware, and in combination with a carriage, a ladle-carrier pivotally mounted thereon, a ladle pivotally mounted on said carrier, mechanism whereby the ladle is caused to be presented to take up a charge, swung out at the side of the machine and tilted to deliver the charge, a cooling-bath in the return path of the empty ladle, and mechanism whereby it is caused to be swung down into said bath and returned to its normal position, consisting of the weighted cam device 50 pivotally mounted on the carriage, the lever-arm 23 pivotally mounted on the ladle-carrier and connected to the pivoted ladle, and the spring 20 connecting said lever-arm and the ladle-carrier, the said weighted cam device being adapted to yield to prevent actuating said lever-arm in the outward swinging movement of the ladle.

18. In a ladling-machine and in combination with a carriage, a rod pivotally mounted thereon, a ladle provided with a handle having direct pivot connection with said rod, means pivoted on said rod having direct connection with the pivoted end of the ladle-handle, means for rocking said rod on its axis to tilt the ladle and for limiting such rocking movement, and mechanism connecting the carriage and its actuating power whereby the said means for dipping and tilting the ladle are actuated and controlled by the movements of the carriage.

19. In a ladling-machine, a pair of ladles geared together, means to reciprocate them and to gather in each a quota from a working chamber, means to swing them from and toward each other, and means to tilt them, whereby the swinging movements of one ladle are effected and controlled by the swinging movements of the other.

20. In a machine for gathering glass in the manufacture of glassware, a pair of ladles, each supported on an independent pivot and geared together for synchronous swinging from and toward each other, a carriage upon which the pair of ladles is mounted, and mechanism to cause the reciprocation of the carriage to carry the pair of ladles into and from the chamber to gather and bring away each a measure and mechanism to cause the ladles to swing out from each other and to be tilted to deliver the measures in the continuous operation of the machine.

21. In a machine for gathering glass in the manufacture of glassware and in combination with a frame, a carriage, means for reciprocating it, a pair of ladles, a swing-head carrier for each ladle, a turn-table for each swing-head, a pair of equal gears engaging said turn-tables, mechanism including engaging devices on the swing-head and frame operating to swing said swing-head carriers laterally toward and from each other and mechanism for tilting the ladles at the limit of their outward swinging movements, whereby the ladles are moved together in parallel relation with a skimming gathering action and outwardly swung and tilted to deliver the charges.

22. In a ladling-machine, and in combination with a ladle a rod, to which the ladle is pivotally mounted, a pivotally-mounted swing-head within which said rod is fitted to rock, and a support for said swing-head, a torsion-spring connecting said rod and swing-head and a lug on said rod engaging said swing-head to hold the ladle in position to fill against the tension of the spring, mechanism constructed and arranged to reciprocate the ladle, mechanism constructed and arranged to swing the ladle laterally, and mechanism constructed and arranged to tilt the ladle against the torsion of said spring.

23. In a machine for gathering glass and conveying it from the melting-chamber to the mold, a ladle and a carrying-rod to which it is pivoted, in combination with means to reciprocate the ladle, means pivotally connecting a second pivot-joint of the ladle with its carrying-rod, and means coöperating with said second joint connections to cause the ladle to dip in moving forward and to rise in moving backward, and means coöperating with said carrying-rod to cause it to swing laterally, to tilt the ladle and to cause it to resume its normal holding position, all the said functions of the ladle being effected and controlled by the reciprocating movements of the carriage through the ladle connections.

24. In a machine for gathering and delivering glass, a spring-sustained ladle, pivotally mounted, means constructed and arranged to cause the ladle to dip upon its pivot against the tension of its sustaining-spring, and means constructed and arranged for reciprocating said ladle into and from a working chamber.

25. In a machine for gathering glass and in combination with a reciprocating carriage, a spring-sustained ladle pivotally mounted on said carriage, and means connecting the ladle at its pivot with said spring, means constructed and arranged and coöperating whereby on the advance of the carriage to the working chamber, the ladle by its connections, is caused to dip in the operation of gathering a charge and to be returned on the retreat of the carriage to its normal position by the tension of its connected spring.

26. In a ladling-machine and in combination with a reciprocating carriage, a rod pivoted at one end to said carriage, a ladle provided with a handle having direct pivot connection with the other end of said rod, means supporting the ladle-carrying end of the rod, a lever device pivoted directly on said rod, means pivotally connecting the ladle-handle to said pivoted device, means fixed on the carriage for engaging the pivoted device, means whereby such engagement is effected, and mechanism for reciprocating the carriage whereby in its advance movement the ladle-carrying rod is caused to engage the pivoted device with the fixed device of the carriage to effect the dipping function of the ladle in the operation of gathering the charge.

27. In an organized machine for gathering glass and in combination with a reciprocating carriage, of a rod pivotally mounted on said carriage, a ladle pivoted to flex on the end of said rod, a device pivotally mounted on said rod and connected to the ladle and having a spring connection with said rod, means on the carriage arranged to engage the pivoted ladle-connecting device, and means including a pivotally-mounted carrier for said rod, arranged and constructed to actuate by the pressure of said pivoted carrier upon the pivoted ladle-connecting device to cause the ladle to dip to gather a measured charge from a working chamber in the way described.

28. In a machine of the class described, the combination of a reciprocating carriage, a rod device pivotally mounted thereon, a ladle pivotally mounted on said rod device, connections constructed and arranged to engage the rod device and the ladle to maintain the latter normally horizontal, means constructed and arranged to engage the said rod device to hold the ladle from tilting, a vertically-yielding device on the carriage for supporting the ladle-rod device, means for depressing said yielding device, a fixed device on the carriage arranged to be engaged by the ladle connection when depressed whereby to cause the ladle to dip in its forward movement, means arranged and constructed to cause the carriage to swing laterally, and means constructed and arranged to engage said rod device in its outward swing whereby to cause it to tilt the ladle.

29. In a ladling-machine and in combination with a reciprocating carriage, a ladle pivotally mounted on said carriage, and mechanism including connections with the pivoted end of the ladle whereby it is caused to dip with a gathering function, means whereby the ladle is caused to have a lateral swinging movement, means connected to the ladle and including a fixed part of the frame, whereby the ladle is caused to tilt, and means connected to the ladle whereby to limit its dipping movement, the said movements of the ladle being effected by the reciprocating movements of the carriage.

30. In a ladling-machine and in combination with a reciprocating carriage, a ladle pivotally mounted thereon, means arranged to hold the ladle level with a yielding force, means on the ladle-rod connected with the ladle and arranged to push it in dipping movement against such force, means to cause the ladle to swing laterally and means to cause the ladle to tilt, the said several means being connected with the ladle, and means on the carriage arranged to impart a pushing force on said ladle connections to cause the ladle to dip, the several movements of the ladle being effected and controlled solely by the movements of the carriage.

31. In a ladling-machine and in combination a reciprocating carriage, a rod normally parallel with said carriage and pivoted thereon and a ladle provided with a handle pivoted normally in alinement with and on said rod, a device pivoted on said rod and connected to the ladle-handle above said rod and a separate projection arranged on the carriage for engaging said pivoted device and means for reciprocating the carriage to effect such engagement to cause the ladle to dip in its movement to gather the charge.

32. In a machine of the character described and in combination with a reciprocating carriage, a rod pivoted at one end thereof, a ladle provided with a handle pivoted directly on the other end of said rod, means constructed and arranged on the rod connecting it with the ladle-handle, and a fixed device on the carriage arranged to engage said rod connection to cause the ladle to dip on the forward movement of the carriage.

33. In a machine for gathering glass and conveying it from a melting-chamber to a mold, and in combination with a carriage, a ladle provided with a handle having direct pivotal connection with the carriage, means constructed and arranged to be actuated by the forward movement of the carriage to cause the ladle to dip in gathering the charge, means constructed and arranged to be operated by the rearward movement of the carriage to cause the ladle to swing in position to discharge the gather, and means also constructed and arranged to be operated by said rearward movement to cause the ladle to tilt to empty the charge, and means for reciprocating the carriage whereby to effect the several functions stated.

34. In a machine of the class described and in combination with a reciprocating carriage, a rod pivoted at one end thereon, a ladle pivoted directly on the other end of said rod, means constructed and arranged to cause the descent of the rod on its pivot, and means constructed and arranged to cause the ladle to have a separate dipping movement on its pivot as the carriage moves forward.

35. In a machine of the character described and in combination with a reciprocating carriage, a rod pivoted at one end thereon, a ladle pivoted directly on the other end of said rod, means constructed and arranged to cause the descent of the rod on its pivot, means constructed and arranged to be actuated by the descent of the rod to cause the ladle to dip on its pivot, as the carriage moves forward, and means constructed and arranged to separately cause the ascent of the rod and the ascent of the ladle at the same time as the carriage moves back to bring the rod and ladle to their normal position.

36. In a machine of the class described and in combination with a reciprocating carriage, a rod mounted to rock axially on said carriage, a ladle pivotally mounted on said rod, a spring to hold the ladle level, a torsion-spring to hold the ladle from tilting, and means to cause said rod to rock and tilt the ladle against the action of said torsion-spring.

37. In a machine of the character described and in combination with a reciprocating carriage, a rod pivoted at one end thereon, a ladle pivoted directly on the other end of said rod, means constructed and arranged to cause the descent of the rod, means constructed and arranged to cause the ladle to dip on its pivot at an inclination greater than that of the rod, as the carriage moves forward, and means constructed and arranged to cause the rod and the ladle to resume their relation of alinement as the carriage moves back.

38. In a ladling-machine, a carriage, a rod pivoted thereon, a ladle provided with a handle pivoted at its end directly on said rod; means pivoted on said rod directly connecting with the pivoted end of the ladle-handle, and means actuated by the movements of the carriage whereby said pivoted means is actuated to cause the ladle to dip as the carriage moves forward.

In testimony whereof I have hereunto signed this specification, in the presence of witnesses, this 1st day of October, A. D. 1897.

WILLIAM FRANCIS ALTENBAUGH.

Witnesses:
  O. J. FEIGHNER,
  J. M. HERSHBURGER.